United States Patent
Soest

(10) Patent No.: US 6,377,889 B1
(45) Date of Patent: Apr. 23, 2002

(54) NON-LINEAR METHOD OF GUIDING TO ARBITRARY CURVES WITH ADAPTIVE FEEDBACK

(75) Inventor: Gerard Van Soest, Wollongong (AU)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/718,518

(22) Filed: Nov. 21, 2000

Related U.S. Application Data

(63) Continuation-in-part of application No. 09/687,978, filed on Oct. 13, 2000.

(51) Int. Cl.$^7$ ............................................. G01C 21/34
(52) U.S. Cl. ...................... 701/207; 701/202; 701/205; 701/210; 340/990
(58) Field of Search ................................. 701/207, 208, 701/209, 210, 211, 202, 201, 205; 340/990, 995; 180/168

(56) References Cited

U.S. PATENT DOCUMENTS 5,233,526 A * 8/1993 Detriche et al. ............ 701/201
5,488,559 A * 1/1996 Seymour .................... 701/207

* cited by examiner

Primary Examiner—Tan Nguyen
(74) Attorney, Agent, or Firm—Wagner Murabito & Hao LLP

(57) ABSTRACT

In one embodiment, the present invention includes a vehicle guidance system. In one embodiment, the vehicle guidance system includes a navigation system capable of providing vehicle location information including the vehicle position. In the present embodiment, the vehicle guidance system further includes data storage means capable of storing at least one pre-determined course having a preferred direction of travel. The present embodiment also includes processing means capable of receiving the vehicle location information, calculating the magnitude of any displacement of the vehicle in a direction perpendicular to the closest point of the predetermined course and thereupon generating an intermediate waypoint at a predetermined response distance from the vehicle. In this embodiment, the intermediate waypoint is generated along a composite line formed by the shortest route from the vehicle to a point of intersection with the predetermined course and extending thereupon along the predetermined route in the preferred direction for a distance along said composite line equal to the predetermined response distance. The present embodiment also calculates the heading from the vehicle to the intermediate waypoint and outputs the same as a corrective course heading.

19 Claims, 4 Drawing Sheets

NON-LINEAR METHOD OF GUIDING TO ARBITRARY CURVES WITH ADAPTIVE FEEDBACK

RELATED APPLICATION

This Application is a Continuation-in-Part of co-pending commonly-owned U.S. patent application Ser. No. 09/687,978 filed Oct. 13, 2000, entitled "NON-LINEAR METHOD OF GUIDING TO ARBITRARY CURVESWITH ADAPTIVE FEEDBACK" to Soest et al.

FIELD OF THE INVENTION

The present invention relates to a navigation and guidance system providing heading correction data to guide to, or maintain a vehicle on, a predetermined course. As used herein, the term vehicle encompasses any suitable manned or unmanned mobile craft, vehicle, missile or means of conveyance, adapted for movement on or through air, water, space or land.

BACKGROUND ART

Many tasks necessitate the navigation of a predetermined route across/through a particular section of land, water surface, seabed, air space or celestial body, including agricultural spraying, geographic surveying, SAR operations, boating man overboard recovery, fire fighting, penetrating hostile airspace and so forth. In many applications, the exact adherence to the predetermined course is degraded by external factors such as wind and tides, internal factors such as system inaccuracies and performance limitations together (when present) with human operator error.

There is often a need to determine the corrective course heading necessary to restore a vehicle to a predetermined course in the most expeditious manner. This may be most simply effected by guiding the vehicle straight to the closest point of the predetermined course. However, due to the intrinsic response latency of both the system and pilot together with the performance characteristics of the vehicle, a corrective heading guiding directly to the closest point of the predetermined course invariably results in the vehicle repetitively overshooting the predetermined course generating lateral oscillations about the predetermined course. This may be avoided if the vehicle came to rest at the point intersection with the predetermined course and was then turned to resume motion along the predetermined course. However, this solution would be unfeasible and undesirable in many dynamic applications employing relatively high-speed vehicles such as in aerial crop-spraying. Furthermore, in many timecritical applications, it is often more effective to bring the vehicle back on course whilst maintaining progress in the direction of the predetermined course without an appreciable reduction in velocity. This requires the vehicle to take a corrective course continuously converging with the predetermined course until coincident with same.

The development of satellite navigation such as Global Positioning System (GPS) provides a means of readily establishing a vehicle's position, its actual course and calculating its displacement from a predetermined course or waypoint. However, in order to provide a corrective heading for an off-course vehicle, a specific destination point on the predetermined course is required. Other than the direct course to the closest point of intersection (with the attendant disadvantages discussed above) specifying any other arbitrary point on the predetermined course would clearly result in an equally arbitrary guidance solution.

Existing prior art solutions utilize the judgment of the vehicle's pilot to interpret a display representing the linear displacement of the vehicle from the closest point of the predetermined course. A lightbar consisting of a row of light emitting diodes (LED) denotes the vehicle's deviation to the left or right of the swath by respectively illuminating a proportional number of LEDs to the left or right of a central 'on course' LED.

The finite resolution of the lightbar (e.g. one LED=30 cm), together with the absence of any corrective heading data results in course oscillations about the swath centre line as the pilot attempts to remain within the tolerance/resolution of the display means. Whilst replacing the corrective displacement indicator with a corrective heading would ameliorate the disadvantages described herein, there remains the hitherto unresolved problem of which point on the predetermined course to guide to. This problem is further exacerbated if the predetermined course is non-linear.

The above described need to restore and maintain a particular vehicle/entity along a defined path is not solely restricted to physical vehicles in the conventional sense of the term. This requirement is equally applicable to non-physical vehicles or entities, such as computer-generated 'virtual' objects/entities in applications such as, navigation and flight/steering simulation software and the motion control of vehicles/objects/figures/guided projectiles and entities types in computer games.

There are numerous other non-vehicular applications or processes which also require the maintenance of dynamic control of two or more variables in accordance with an optimum predetermined mathematical solution, wherein the actual instantaneous numerical value or quantity of the said variables would analogous to the 'vehicle' location in the above described applications. The desired predetermined course of the 'vehicle' could be represented by a plot of the optimum solution with respect to time (or some other irreversible quantity). As an example, the desired solution/predetermined course could be the instantaneous ratio (which may vary over time) of two or more chemical constituents being continuously combined as part of an industrial process. In this instance, any variation of the ratio of the constituents from the desired solution would be equivalent to a displacement of a physical vehicle from a predetermined course. The ideal corrective action to the input (or output) rate of one or more of the constituents to obtain the desired ratio is governed by directly equivalent criteria to that described above in the vehicular application, i.e. a critically damped, non-oscillating return to the correct ratio.

Consequently, despite the differing nature of the above described applications and though in some instances grammatically unorthodox, consistent terminology will be used throughout the specification for the sake of succinctness and clarity, wherein the following definitions of key terms shall apply in both the description and claims.

the term 'vehicle' is any object or quantity whose location may vary with respect to some irreversible variable such as time and encompasses any suitable manned or unmanned mobile craft, vehicle, missile or means of conveyance (including simulated, virtual or software generated vehicles or entities), adapted for movement on or through air, water, space, land or any other real, simulated, virtual or mathematically generated environment and also includes dynamic numerical values attributed to particular quantities, ratios and/or other parameters.

the term 'location' is defined as a point of interest, a real or imaginary postion in a two, three or more dimensional space, or a coordinate in any convenient co-ordinated system.

the term 'corrective heading' includes a conventional heading change, such as a change of heading, pitch, roll or yaw or a set of partial derivatives, such as a change in pressure, temerature or speed with respect to time.

the term 'predetermined' includes any physical, virtual, geographical path or mathematical solution representing the desired location for the vehicle location.

DISCLOSURE OF INVENTION

It is object of the present invention to provide a means for guiding to linear and non-linear guidance curves/courses or solutions which overcomes the aforesaid disadvantages.

It is a further object of the present invention to provide corrective data to mitigate any deviation of a vehicle from a predetermined course by progressively re-aligning the vehicle's heading to coincide with the predetermined course whilst minimizing any discontinuities or excessive course oscillations.

The present invention provides a guidance system for a vehicle and a method for executing same, comprising;

navigation system capable of providing vehicle location information including the position of said vehicle, a data storage means capable of storing at least one pre-determined course having a preferred direction of travel, a processing means capable of receiving the said vehicle location information, calculating the magnitude of any displacement of said vehicle from said predetermined course along a direct path to the closest point of said predetermined course and thereupon generating an intermediate waypoint at a predetermined response distance from said vehicle at a point along a composite line formed by the shortest route from the vehicle to a point of intersection with the predetermined course and extending thereupon along the said predetermined route in said preferred direction for a distance along said composite line equal to said predetermined response distance, calculating the heading from the vehicle to the intermediate waypoint and outputting same as a corrective course heading.

The vehicle heading is then altered in accordance with the corrective course heading, either automatically or manually by a user and the new vehicle postion and heading is detected after a predetermined time interval, whereupon an updated corrective course heading is calculated.

The magnitude of said predetermined distance may be a function of one or more of said vehicle location parameters or be a simple fixed value.

One or more elements of the above vehicle guidance system may be located either onboard or external to the vehicle.

As used herein, the various headings referred to may be defined in accordance with any convenient frame of reference, e.g. magnetic/compass bearings, relative to a local grid or waypoints, Cartesian co-ordinates and so forth.

These and other objects and advantages of the present invention will become readily apparent to those skilled in the art from the following detailed description. The various features of novelty which characterize the present invention are detailed in the claims annexed hereto and form part of this disclosure. To provide a clear understanding of invention and its advantages attained through its use, reference is made the accompanying drawings and descriptive matter in which preferred embodiments of the invention are illustrated.

BEST MODE FOR CARRYING OUT THE INVENTION

Figure 1A:
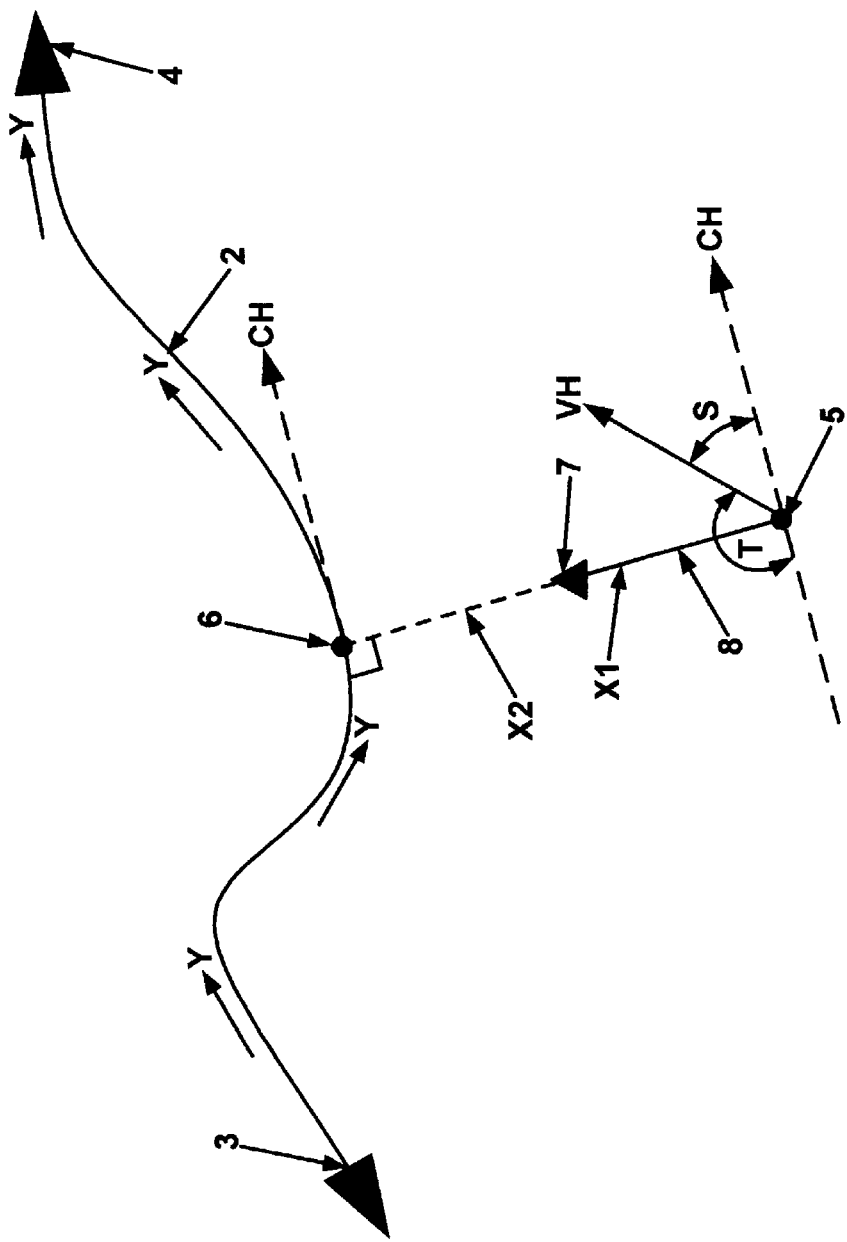
FIG. 1a) shows a diagram illustrating the navigational plot employed by the present invention when the vehicle is relatively distant from the guidance curve.

As previously discussed, the present invention relates generally to an on-board navigation and guidance system enabling a suitable vehicle to adhere, or be guided back to, a predetermined course. The predetermined course may be stored in advance of the mission or could be fed to the navigation system in real time. Although the present invention is equally adaptable to two or more dimensions and to a wide variety of manned or unmanned applications, aspects of the following embodiment are described in relation to agricultural crop-spraying. However, this is purely exemplary and is in no way intended to limit the many possible variants and adaptations of the present invention that will be evident to those skilled in the art.

The spraying of fields with supplemental chemicals by land vehicles and aircraft/helicopters to protect crops and enhance yield is an established agricultural technique. Dependant on the configuration of the target area, an application pattern is devised which takes account of the width of each swath that can adequately be covered in a single pass by the applicator/spray vehicle., geographical anomalies in the target area (e.g. houses, tree clusters), the vehicle's turning radius at the end of each spray lane/swath and the payload capacity.

A key aim is the minimization of oversprays between swaths and un-sprayed voids and this is directly affected by the spray vehicles ability to remain on the designated spray path. In comparison to terrestrial means, aerial spraying offers the attraction of reduced execution time and the absence of collateral crop damage. However, for a variety of reasons including the higher application speeds, simply following the existing cultivation lines is impractical and an alternative guidance means is required for the pilot.

The guidance means is required to provide visual prompts to the pilot to acquire and maintain alignment of the craft with the predetermined course whilst maintaining an external visual awareness of the surrounding terrain. Though capable of performing complex subconscious estimations and judgement calculations, the human mind is nevertheless more receptive to processing visual information in certain formats. The previously discussed prior art solutions of using illuminated LEDs on a lightbar to represent the linear displacement of the vehicle from the predetermined course requires the user to judge the appropriate corrective course heading to re-aligned the vehicle on course without overshooting.

A far more natural and readily interpreted visual indicator is for the magnitude and direction of the corrective heading change required or even the resultant corrective heading itself to be directly displayed to the pilot. This replicates the manner in which humans navigate themselves whilst walking, running, driving and so forth and thus feels far more intuitive to the user. As previously discussed, the existing difficulty with establishing such a corrective heading is the difficulty in establishing which point or points on the predetermined course to navigate to. The present invention provides such a facility by virtue of its novel and inventive guidance solution as described herein in greater detail.

FIG. 1a shows a predetermined course in the form of guidance curve (2) having a start point (3) and an end point (4) and the location of a vehicle (5) displaced from the guidance curve(2). It will be appreciated that the start and end points (3, 4) do not necessarily represent the actual beginning and end of the vehicle's (5) entire journey, but may demarcate a particular segment of the guidance curve (2). Indeed, the whole guidance curve (2) may be composed of a plurality of segments, or there may not even be a specific start or end point (3, 4) at all, as in the case of a closed loop curve (2), e.g. the orbit of a satellite. whilst a start and end point (3, 4) are incorporated in the following description for the sake of clarity and understanding, the present invention only requires that the vehicle's (5) preferred direction of travel (shown in FIG. 1a by the direction of reference arrow Y) along the guidance curve (2) is known. Clearly, if a start and end point (3, 4) are known, the preferred direction of travel Y may be readily calculated. In-fact, it will-be evident that only one of either the start or end point (3, 4) location need be specified to define the preferred direction of travel Y, i.e. the direction away from the start point (3) or towards the end point (4). In less sophisticated embodiments of the guidance system, the preferred direction of travel Y may be determined by the judgement of the pilot/user of the vehicle (5) who decides which direction to follow the course (2).

Regardless of the means utilized for defining the preferred direction Y, the same method for calculating a corrective heading (as described further herein) is employed. The various means of determining the preferred direction of travel Y are examined in more detail later. Guiding the vehicle (5) back 'on course' the curve (2) requires the resolution of two factors;

a) bringing the vehicle back to a point on the guidance curve (2) and b) orientating the heading of the vehicle to align with the direction of the curve (2).

Effecting just one of points a) or b) in most expedient manner would be to the direct detriment of the other. Guiding the vehicle (5) to the guidance curve (2) via the most direct route, i.e., a linear path from the vehicle (5) perpendicular to the guidance curve (2), would,—by definition, result in the vehicle's (5) heading remaining perpendicular to the direction of the curve (2) (at the closest point) until it reached the curve (2). Conversely, maintaining the heading of an off-course vehicle (5) to match that of the closest point of the curve (without first moving it onto the curve (2)) would constrain the vehicle to travel on a parallel course to the guidance curve (2) without ever meeting it.

Thus a compromise solution is employed by seeking to achieve points a) and b) simultaneously. The weighting given to these two parameters depends on relative importance of returning the vehicle to, and thereupon remaining in, close proximity of the curve (2) versus aligning the vehicle's (5) heading VH with that of the curve (2) as smoothly as possible to minimize oscillations about the course (2) and heading discrepancies between the vehicle (5) and the curve (2). The present invention enables the guidance solution to be optimized for either of these parameters.

Figure 1B:
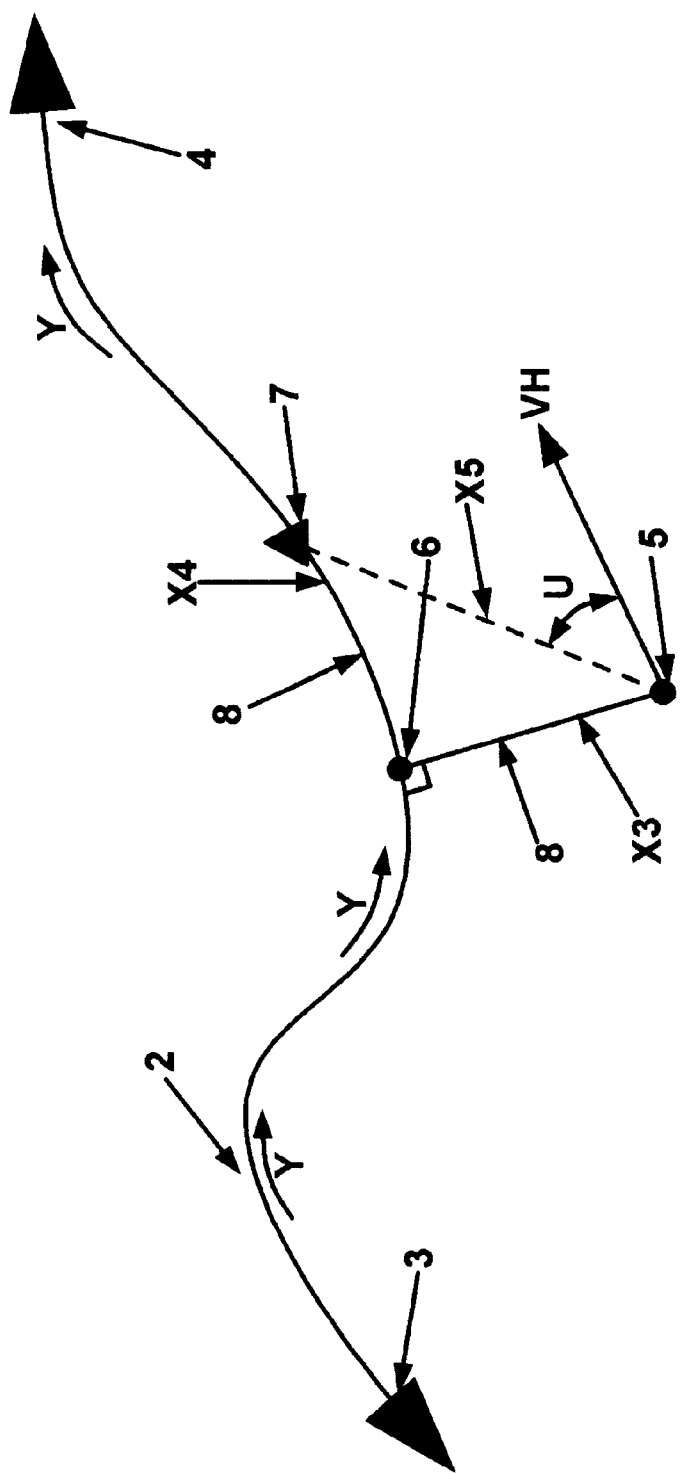
FIG. 1b) shows a diagram illustrating the navigational plot employed by the present invention when the vehicle is relatively close from the guidance curve.

The following method of calculating the corrective heading is generic to all embodiments of the present invention and initially consists of generating an intermediate waypoint (7) at a predetermined response distance (8) from the vehicle (5). The intermediate navigation point (7) is located at a point along the composite line formed from the vehicle (5) to the closest point (6) of the guidance curve (2) and extending thereupon along the guidance curve (2) in the preferred direction Y towards the end point (4) for a distance equal to the response distance (8). Consequently, for a given response distance (8), there are two basic spatial configurations wherein the direct distance from the vehicle (5) to the closest point (6) of the curve (2) (represented in FIG. 1a by the combination of X1 and X2) is either:

i) greater than the said response distance (8) (also represented by X1 in FIG 1a). As the intermediate waypoint (7) is therefore located along the shortest route (X1, X2), the corrective heading for the vehicle is coincident with the bearing to the closest point (6) of the curve (2) from the vehicle (5), or ii) less than the said response distance (8), as shown in FIG 1b. In these circumstances, the response distance (8) is a composite line formed by the direct distance from the vehicle (5) to the closest point (6) of the curve (2) (represented by X3) and then extending along the guidance curve (2) in the direction preferred direction Y towards end point (4) for distance represented by X4. The magnitude of X4 is equal to the difference between the total response distance (8) and the perpendicular distance from the curve (2) to the vehicle (5), i.e. X4=X1–X3. The corrective heading (represented in FIG. 1a by X5) is the bearing from the vehicle (5) to the waypoint (7) located at the distance X4 measured along the curve (2) from intersection point (6) towards the end point (4), irrespective of the linear or curved nature of the guidance curve (2).

The calculation of the intermediate waypoint (7) location (and associated corrective heading X5) is repeated at regular time intervals to generate a continuously updated corrective guidance solution. As the vehicle (5) gets closer to the curve (2), the proportion of the response distance (8) represented by the distance X3 diminishes in a direct relation to the increase in X4.

The means of determining the value of the response distance (8) can range from empirically establishing a single fixed value through use and/or testing, to use of a function incorporating parameters such as maximum vehicle turn rate, the minimum turn radius, operator and system response capabilities, vehicle speed and so forth. These and/or other parameters may be factored according to a predetermined significance weighting to give a fixed response distance (8) figure for a 9, given mission. As an illustration, in the case of a land-based crop-spraying application it has been found practical to use a response distance (8) equal to the maximum of either a fixed figure (e.g. 10 meters) or a user selected time value multiplied by the vehicle (5) speed.

Alternatively, the said response distance constituent parameters may include dynamic variables such as for example, increasing the response distance (8) in proportion with increasing vehicle speed, thus decreasing the system sensitivity at higher vehicle speeds and the attendant risk of unstable oscillations.

As previously stated, the start and end points (3, 4) may respectively refer to the vehicle's actual initial location and final destination, or alternatively to those of a particular segment of the guidance curve (2). Dividing the guidance curve (2) into a plurality of segments enables differing response distances (8) to be employed, tailored to the specific characteristics of the segment, e.g. shorter for winding, indirect sections and longer for linear or near linear sections.

One method employed for producing a spray coverage plan for a crop field is to define a series of concentric closed loops (i.e. guidance curves (2)) instead of a single guidance course (2) incrementally traversing the whole field. If the location of the intermediate waypoint (7) surpasses the end point (4), i.e., the end point (4) is closer than the response distance (8), the vehicle either commences the next guidance curve segment (if present), stops at the end point (4) if this is the final destination, or the vehicle simply proceeds past the end point (4) without further auto guidance correction. The start and end points (3, 4) also provide a means for resolving any ambiguity concerning which direction along the curve (2) to locate the intermediate waypoint after measuring to the intersection point (6).

In some circumstances where the vehicle (5) is not on the curve (2), but is close to either the start of end point (3,4) then the closest point on the curve (2) to the vehicle (5) is not necessarily perpendicular to the curve (2). This situation can be resolved by either extrapolating an extension of the curve from the start or end point (3, 4) until the shortest distance to the vehicle (5) is perpendicular to the extrapolated portion of the curve (2), or simply using the direct path to the start/end point (3,4), regardless of its orientation to the curve (2).

It will be evident that an unpiloted vehicle (5) with an automated guidance system requires that the preferred direction of travel Y is known to the guidance system, either by direct input (e.g. from the user) or by calculation from the existance of a known start and end point (3, 4). As discussed earlier, in the case of piloted vehicles (5), it is possible for the guidance curve (2) to be stored by the guidance system without a preferred direction attribute; leaving to the pilot's judgement in which direction to follow the curve (2). In some possible scenarios, it may in fact be irrelevant which direction the curve (2) is travelled (i.e., both possible directions are equally favored), provided the vehicle adheres closely to the curve (2). In order to provide an appropriate corrective heading in all such situations, one of the two possible directions of travel of curve (2) is still required to be considered as the preferred direction Y at any one time and this may be achieved in a variety of ways.

In the vast majority of situations when a vehicle deviates from the curve (2), the preferred direction of travel Y of the guidance curve (2) would still be obvious to the user/pilot by virtue of a common-sense comparison with the vehicle's (5) heading prior to deviating from the curve (2), i.e., the vehicle would normal turn through the smaller of the two possible angles to re-align the vehicle (5) with the curve (2).

If for some reason, the vehicle (5) veered rapidly off-course from the curve (2) through more than $\pi/2$ radians (thus possibly tempting the pilot/user to turn the wrong way back to the curve (2)) it is still unlikely that the pilot/user would become so disoriented as to forget which side of the curve (2) the vehicle (5) was on. Thus, there would be only one plausible interpretation of the direction in which to make the corrective change of heading to realign the vehicle (5) with the preferred direction of travel along the curve (2). The preferred direction Y to travel the curve (2) at the closest point (6) to the vehicle (5) may for example be taken as;

i) the direction of said guidance curve (2) which subtends the smaller angle S of the two angles (S & T) (as shown in FIG. 1a) formed between the extrapolation of the vehicle heading VH and the heading CH of the guidance curve (2) at the closest point (6) to the vehicle (5), or ii) being the direction of said guidance curve (2) at the closest point (6) to said vehicle (5) subtending an angle of magnitude of $<\pi/2$ or $\pi/2$ between the vehicle heading VA, and the heading CH of the guidance curve (2) at the closest point (6) to the vehicle (5).

To aid clarity, the heading of the guidance curve (2) at the closest point (6) is shown transposed onto the location of the vehicle (5) to illustrate the interrelation of the angles discussed above. Clearly, the vehicle heading VH and the guidance curve (2) heading CH could be extrapolated from their actual positions to effect the same calculation. Purely for the purposes of the test in point ii), it is necessary to attribute a notional 'forwards' and 'backwards' direction to the curve (2), e.g. define the direction from the start point (3) to the end point (4) as 'forward'. However, this does not imply either direction is the preferred direction Y as this is determined by the test result, i.e., if the difference between the heading of the curve (2) at the nearest point (6) and vehicle heading is $<\pi/2$, the direction of vehicle travel, i.e. the preferred direction Y is in the 'forward' direction, if not (i.e. $\geq\pi/2$) the preferred direction Y is in the reciprocal 'backwards' direction. The possible ambiguity in the case of a vehicle heading either directly towards or away from the curve (2) orthogonally is easily resolved by defining this direction to be included in either the 'forward' or 'backward' direction, simply by making the test $<\pi/2$, or $\pi/2$, or $\pi/2$. It is not a major consideration in practice as the vehicle is unlikely to maintain a precisely orthogonal course to or of from curve (2) for a prolonged period without a substantial turn to align with the curve (2) in one of the two possible directions.

In practice, it is not physically possible to instantaneously align the vehicle heading VH with the corrective heading X5 calculated by the guidance system. Consequently, a more 'user friendly' means of imparting the corrective information to the pilot is to display the angular change (direction and magnitude) in heading U (as shown in FIG. 1b) required to align the vehicle heading VH with the calculated corrective heading X5. A further, possibly more intuitive type of guidance information, is to display the rate of change required in the corrective heading U, i.e. the differential with respect to time.

Figure 2A:
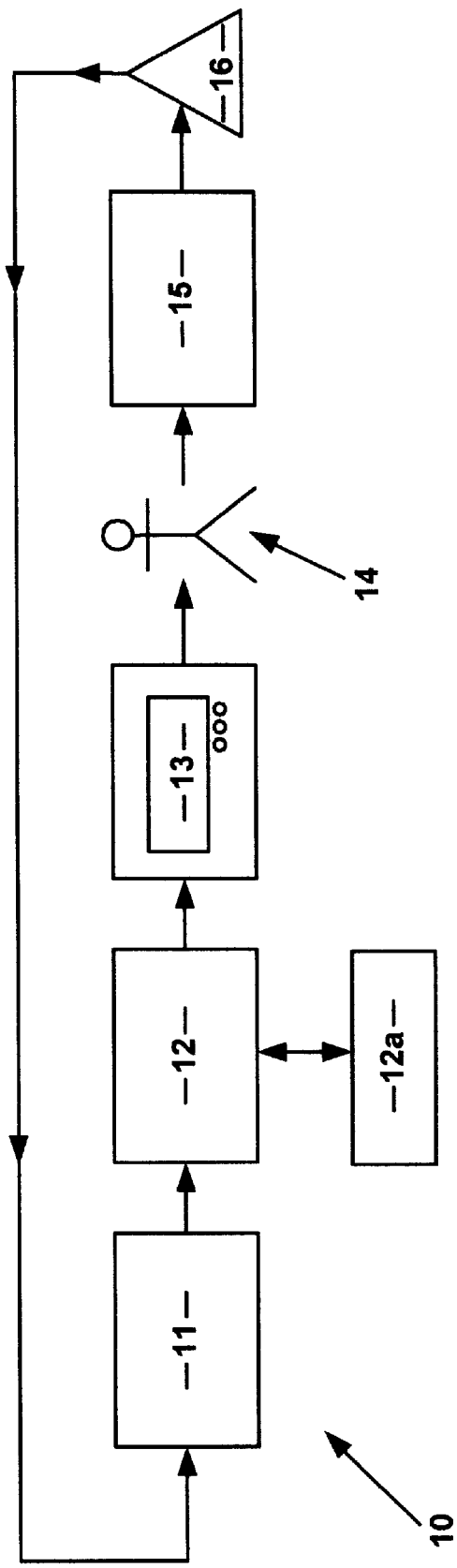
FIG. 2a) a schematic diagram of a manned embodiment of the present invention.
Figure 2B:
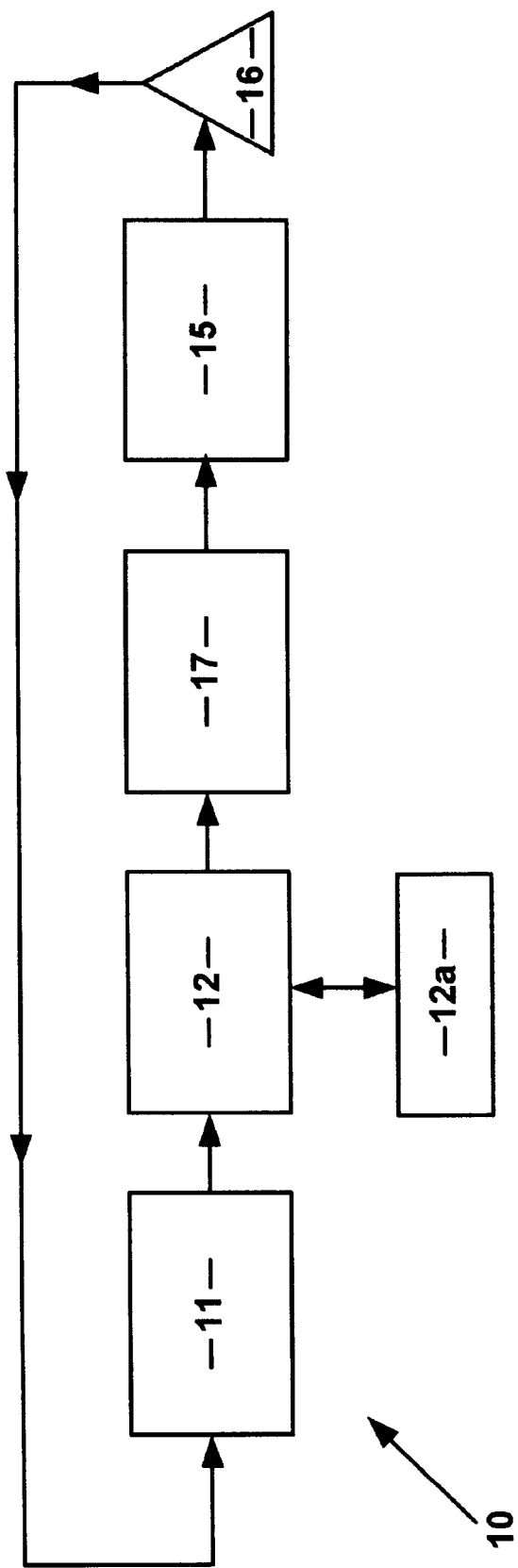
FIG. 2b) a schematic diagram of an unmanned embodiment of the present invention.

To perform the aforesaid guidance calculations, the present invention referred to herein by the general reference numeral (10), comprises a system shown in FIGS. 2a and 2b by a plurality of schematic function blocks which may be implemented by a variety of devices either well-known in the art or described herein and are consequently not described further for sake of succinctness except for the purposes of an enabling disclosure.

Referring to FIG. 2a an embodiment of the present invention adapted for use with a piloted vehicle is illustrated. Vehicle location information is computed from a navigation receiver (11), which may for example, be of the GPS or global navigation satellite system (GLONASS) types. However, the present invention does not implicitly require such systems and other more traditional navigation means of receiving and processing externally generated location data may be employed, or conceivably, even an self-contained inertial system of sufficient accuracy.

The vehicle location information comprises one or more parameters including at least the vehicle's position and preferably the velocity and heading also. The location information is outputted to a processing means (12) incorporating a bidirectional connection to a memory storage means (12a) which is capable of receiving and storing one or more user-defined parameters including guidance curves (2), response distances (8) and associated preferred direction Y attributes. The processing means (12) computes the shortest distance between the location of the vehicle (5) and the nearest point of the guidance curve (2) and then generates the intermediate waypoint (7) at a point along the composite line formed from the vehicle (5) to the closest intersection point (6) of the curve (2) and extending thereupon in the preferred direction Y along the curve (2) for a distance along said composite line equal to the response distance (8). The processing means (12) computes the corrective heading from the vehicle (5) to the intermediate waypoint (7) and outputs same to a visual display means (13).

Any suitable means may be employed to display the corrective heading required to return to the guidance curve (2) though in the aforementioned aerial crop-spraying example, the display means (13) should ideally enable rapid assimilation of the guidance information by the pilot (14), without unduly hindering or mitigating the pilot's awareness of the surrounding terrain. Having been visually apprised of the corrective heading, the pilot (14) provides an input to the appropriate vehicle controls (15), e.g. steering wheel, joystick, and so forth. This result in an actual change in the heading VH and location (16) of the vehicle (5), which is detected by the navigation receiver (11) to complete a corrective feedback loop for the system. The calculation of the corrective heading is continally repeated and updated at a predetermined time interval to take account of the vehicles movement, giving a smooth assimilation of the vehicle (5) to the curve (2).

As previously stated, the course correction information displayed to the pilot (14) may be more readily be utilized if displayed as the direction and magnitude U of the heading change required to align the vehicle heading VH with the corrective course X5.

FIG. 2b shows an alternative system embodiment which replaces the display means (13) and pilot (14) with an automated control system (17) for application in unmanned vehicles. This embodiment operates in an identical manner to the aforesaid piloted embodiment, with the obvious exceptions that the corrective headings outputted from the processing means (12) do not need to be displayed visually and are instead received in an appropriate format directly by the automated control system (17), which interprets the corrective heading data and computes and outputs the appropriate control signals to the vehicle controls (15). Although it could be expected that the unmanned completely automated embodiment would exhibit a reduced response latency and more accurate control signals to the vehicle control accuracy in comparison to a human operator, nevertheless the response would still not be instantaneous nor completely accurate.

Moreover, external factors governing the movement of the vehicle (such as cross winds or tides) would eventually corrupt the ability of the vehicle (5) to be re-aligned with the guidance curve (2) without the use of corrective feedback. This operates in an identical manner to the piloted embodiment whereby the change in location (16) and heading VH of the vehicle (5) resulting from control signals inputs to the vehicle controls (15) is detected by the navigation receiver (11) and thus completing the corrective feedback loop. The corrective heading is again recalculated at successive predetermined time intervals to take account of the vehicles movement in a corresponding manner to the manned embodiment.

In different configurations of the embodiments shown in FIGS. 2a–b), one or more of the system elements (11, 12 and 12a) may be located in a remote position instead of onboard the vehicle (5). A single processing means (12) could be used to receive the vehicle location information from a plurality of navigation receivers (11) located on a corresponding plurality of individual vehicles. The processing means (12) would then calculate and transmit the individual corrective headings to each individual vehicle (5) by any suitable means. Utilizing a single processing means (12) in this manner would reduce the total system (10) costs of providing corrective guidance to a number of the vehicles (5) whilst simplifying the individual system requirement for each vehicles (5).

The aforementioned benefits could be a further enhanced by removing the individual navigation receivers (11) from the or each vehicle (5) and using the alternative means of detecting the location each vehicle (5). This may be achieved in several ways, such as one or more radar, acoustic, thermal, optical or magnetic movement sensors capable of detecting the relative movement and/or position of each vehicle (5) with respect at least one predetermined frame of reference, e.g. the geographical location of a radar detector (for example) equipped with-a GPS navigation receiver. In such a system, the absolute postion of each vehicle (5) is not vital provided its relative position/movement to the guidance curve (2) may be detected. An alternative to a single central location detection means (11) (e.g. a radar detector) is a plurality of position sensors located about the specific area of allowable movement of each vehicle (5), e.g. below particular road surfaces. Applications could involve automated unmanned vehicles used in mines, quarries, warehouses, battlefields, and so forth. In such an embodiment, there would be a corresponding reduction in the costs and complexity associated with equipping each vehicle (5) with an individual GPS receiver.

In order to perform the invention (10) in such embodiments, the only elements necessary to be located onboard a physical vehicle (5) are the means of receiving the corrective headings (and displaying same on a display means (13) in the case of a manned vehicle (5)) from a processing means (12) and the appropriate vehicle control means (15) to implement the heading correction.

In the case of a non-physical vehicle such as a computer simulated entity (e.g. conventional vehicles, aircraft, ships, people, abstract/fantasy-type beings, aliens and so forth), the position and heading of each vehicle (5) would already be defined by, and known to, the controlling software. Therefore, there is no requirement to independently establish the location, or heading of the 'vehicle' (5); the present invention (10) is simply required to control the behavior of each vehicle's (5) movement whilst being guided back to a particular software defined guidance curve (2). Whilst there are clearly myriad possible implementations of such software, the essence of the guidance calculation used in the present invention would remain the same.

As mentioned above, the present invention could also be applied to abstract or mathematical environments/applications where the vehicle (5) is not a entity as such, but could instead represent the instantaneous numerical value of the quantities or ratio of two or more constituents being combined (or separated) in some type of dynamic process wherein there is a predetermined 'optimum' value for the said ratio/absolute value at any given time. Therefore, any departure from the optimum value can be considered as analogous to the displacement of the vehicle (5) from guidance curve (2), wherein a plot of the said optimum value over time is equivalent to the guidance curve (2) in the previous embodiments. The guidance algorithm employed in the present invention would be equally suitable as a means of adjusting the various inputs/outputs to the system (e.g. the inputs/outputs flow rates of the constituent chemicals/ materials used in the process) in order to bring the instantaneous ratio value towards the optimum value without over compensation or oscillation. In conventional circumstances, the 'preferred direction' would be the passage of time in its normal sense, i.e. the 'forward' direction.

In purely mathematical terms, the present invention (10) need not be restricted to solutions in the three conventional physical dimensions (plus time as the forth dimension) and may be applied to any number of dimensions.

In the foregoing specification, the present invention has been described with reference to specific exemplary embodiments thereof. It will, however, be evident that various modifications and alterations may be made thereof without departing from the broader spirit and scope of the invention as set forth in the appended claims. The specification and drawings, are, accordingly, to be regarded in the illustrative rather than a restrictive sense.

What is claimed is:

1. A vehicle guidance system, comprising;
   a navigation system capable of providing vehicle location information including the vehicle position,
   a data storage means capable of storing at least one pre-determined course having a preferred direction of travel,
   a processing means capable of receiving the said vehicle location information, calculating the magnitude of any displacement of said vehicle in a direction perpendicular to the closest point of said predetermined course and thereupon generating an intermediate waypoint at a predetermined response distance from said vehicle, along a composite line formed by the shortest route from the vehicle to a point of intersection with the predetermined course and extending thereupon along the said predetermined route in said preferred direction for a distance along said composite line equal to said predetermined response distance, calculating the heading from the vehicle to the intermediate waypoint and outputting same as a corrective course heading.

2. A vehicle guidance system as claimed in claim 1, wherein said vehicle location information includes one or more vehicle location parameters selected from the group consisting of: the vehicle's velocity, and the vehicle's heading.

3. A vehicle guidance system as claimed in claim 2, wherein the magnitude of said predetermined distance is a function of one or more of said vehicle location parameters.

4. A vehicle guidance system as claimed in claim 1, wherein said processing means calculates and outputs the heading change from the vehicle heading to said corrective course heading.

5. A vehicle guidance system as claimed in claim 1, wherein said preferred direction is inputted to said data storage means as an attribute of at least one pre-determined course.

6. A vehicle guidance system as claimed in claim 1, wherein said preferred direction is defined by the direction of said pre-determined course from said point of intersection towards an end point, or away from a start point inputted to said data storage means as an attribute of said predetermined response distance.

7. A vehicle guidance system as claimed in claim 1, wherein said preferred direction is defined by the direction of said pre-determined course which subtends the smaller angle of two angles formed between the vehicles heading and the heading of the pre-determined course at the closest point to the vehicle.

8. A vehicle guidance system as claimed in claim 1, wherein said preferred direction is defined by the direction along said predetermined course at the closest point to the vehicle subtending an angle of magnitude $<\pi/2$ radians with the vehicle heading.

9. A vehicle guidance system as claimed in claim 1, wherein said preferred direction is defined by the direction along said predetermined course at the closest point to the vehicle subtending an angle of magnitude $\pi/2$ radians with the vehicle heading.

10. A vehicle guidance system as claimed in claim 1, wherein at least one of said navigation system, data storage means and/or said processing means are located separately from said vehicle.

11. A method for guiding a vehicle on or to a predetermined guidance curve having a preferred direction of travel, said method comprising;
    determining the location of said vehicle and any displacement from said predetermined course,
    generating an intermediate navigation waypoint at a point along a composite line formed by the shortest route from the vehicle to a point of intersection with the predetermined course and extending thereupon along the said predetermined route in said preferred direction for a distance along said composite line equal to a predetermined response distance,
    calculating the heading from the vehicle to the intermediate waypoint and outputting same as a corrective course heading.

12. The method as claimed in claim 11, further comprising;
    transmitting said corrective course heading to a vehicle operator,
    the application of course correction inputs to the vehicle by the said operator based on said corrective course heading,
    detecting the change in vehicle position after a predetermined time interval and repeating the method steps of claim 11.

13. The method as claimed in claim 11, further comprising;
    calculating the heading change from the vehicle heading to said corrective course heading and transmitting same as corrective data to a operator,
    the application of course correction inputs to the vehicle by the said operator based on said corrective data,
    detecting the change in vehicle position after a predetermined time interval and repeating the method steps of claim 11.

14. The method as claimed in claim 11, further comprising;
    inputting said corrective course heading to a vehicle control means, calculating corresponding control signals required by a velocity and heading control means to execute said corrective course,
    outputting said control signals to the velocity and heading control means, executing same and,
    detecting the change in vehicle position after a predetermined time interval and repeating the method steps of claim 11.

15. The method as claimed in any one of claims 11–14, wherein said preferred direction is inputted to said data storage means as an attribute of at least one predetermined course.

16. The method as claimed in any one of claims 11–14, wherein said preferred direction is defined by the direction of said pre-determined course from said point of intersection towards an end point, or away from a start point inputted to said data storage means as an attribute of said predetermined response distance.

17. The method as claimed in any one of claims 11–14, wherein said preferred direction is defined by the direction along said predetermined course which subtends the smaller angle of two angles formed between the vehicle heading and the heading of the pre-determined course at the closest point to the vehicle.

18. The method as claimed in any one of claims 11–14, wherein said preferred direction is defined by the direction along said predetermined course at the closest point to the vehicle subtending an angle of magnitude $<\pi/2$ radians with the vehicle heading.

19. The method as claimed in any one of claims 11–14, wherein said preferred direction is defined by the direction along said predetermined course at the closest point to the vehicle subtending an angle of magnitude $\pi/2$ radians with the vehicle heading.

* * * * *